Jan. 4, 1944.  C. HERZOG  2,338,514
VARIABLE SPEED GEARING
Filed June 5, 1943  3 Sheets-Sheet 1
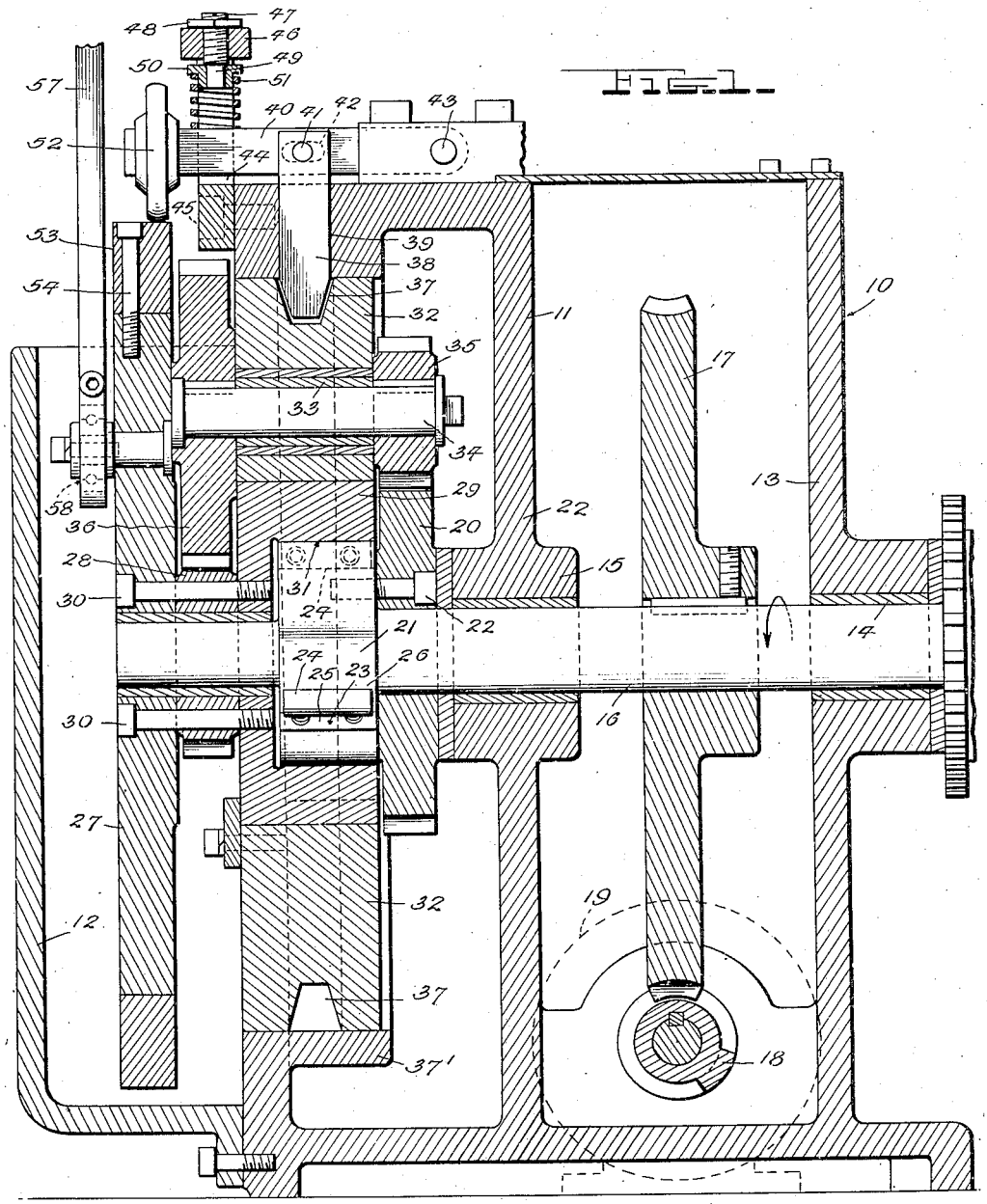
Inventor
Carl Herzog.
By
Attorney

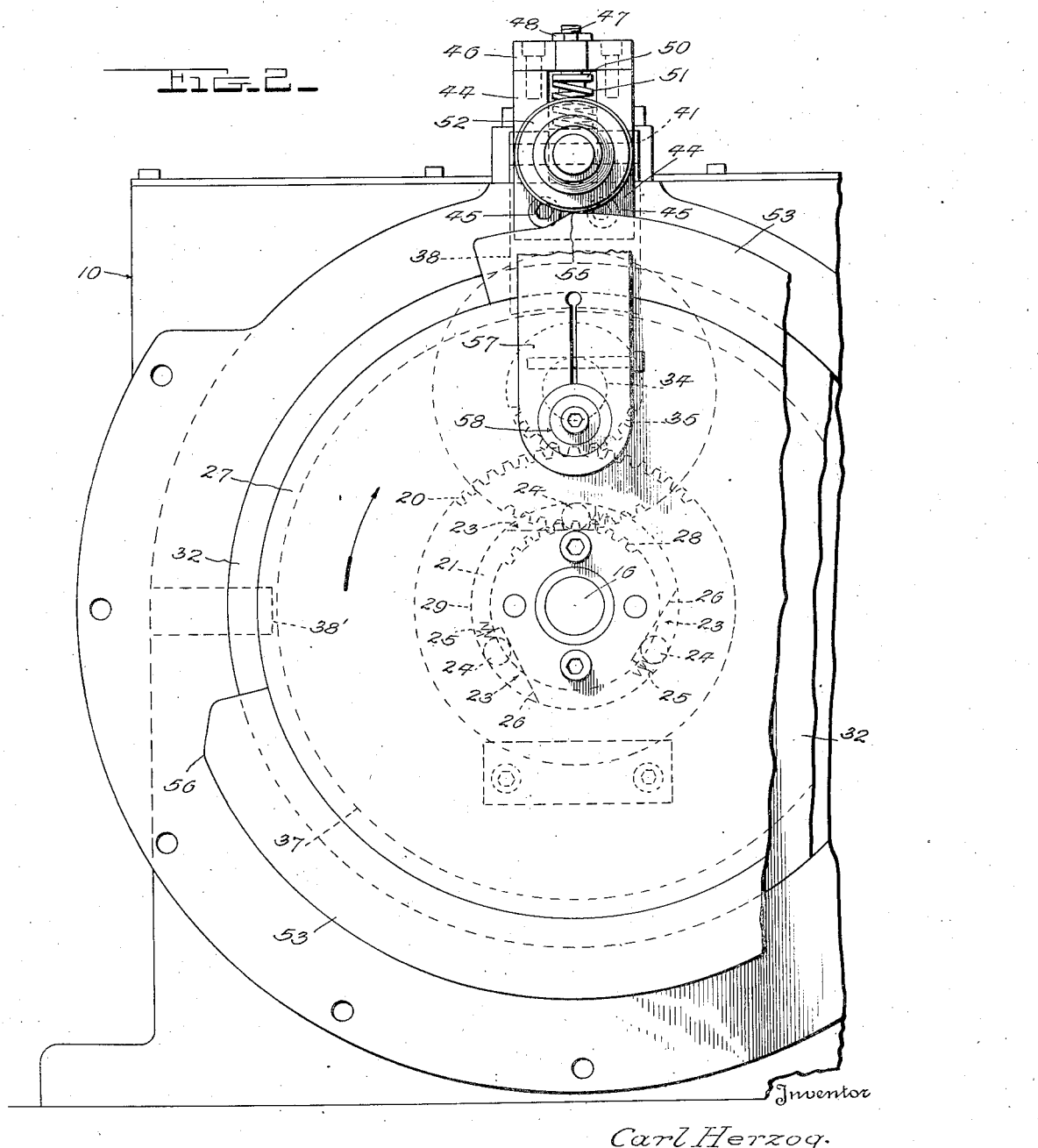

Jan. 4, 1944.   C. HERZOG   2,338,514
VARIABLE SPEED GEARING
Filed June 5, 1943   3 Sheets-Sheet 3
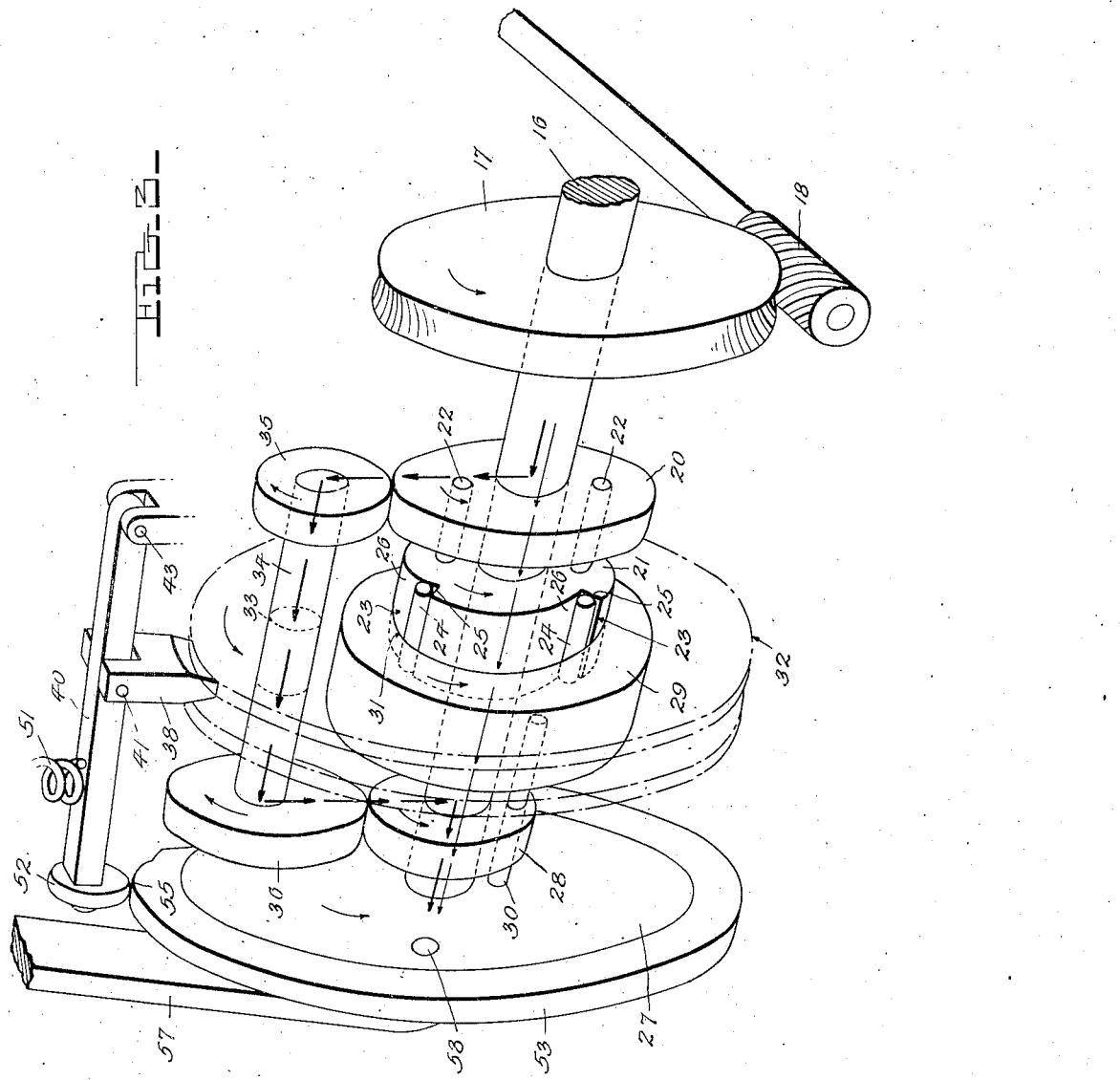
Inventor
Carl Herzog.
By
Attorney Patented Jan. 4, 1944

2,338,514

UNITED STATES PATENT OFFICE 2,338,514

VARIABLE SPEED GEARING

Carl Herzog, Belleville, N. J.

Application June 5, 1943, Serial No. 489,830

7 Claims. (Cl. 74—394)

My invention relates to variable speed gearing.

An important object of the invention is to provide gearing which will turn a driven member at a constant speed throughout a portion of the cycle and at an increased speed throughout the remainder of the cycle.

A further object of the invention is to provide gearing of the above mentioned character which is automatic in operation.

A further object of the invention is to provide gearing of the above mentioned character having a cam which controls the constant turning movement and the increased turning movement, whereby a cam of the desired length may be used for regulating the relative extents of such turning movements.

A further object of the invention is to provide gearing of the above mentioned character which is adapted for operating indexing mechanism, for saving time ordinarily lost during the indexing periods.

A further object of the invention is to provide gearing of the above mentioned character, which is simple in construction, and reliable in operation.

Other objects and advantages of the invention will be apparent during the course of the following description.

In the accompanying drawings forming a part of this application and in which like numerals are employed to designate like parts throughout the same, Figure 1 is a central vertical section through variable speed gearing embodying my invention, Figure 2 is an end elevation of the same, parts broken away, and parts removed, and Figure 3 is a perspective view of the gearing, partly diagrammatic, and parts separated.

In the drawings, wherein for the purpose of illustration is shown a preferred embodiment of my invention, the numeral 10 designates a casing having a transverse web 11 and a guard 12 at one end thereof. The casing includes an end 13, having a bearing 14, in alignment with a bearing 15, and bearings 14 and 15 receive a rotatable shaft 16, which is horizontal and held against perceptible longitudinal movement. The shaft 16 has a worm wheel 17, rigidly secured thereto, and driven by a worm 18, in turn driven by a constant speed motor 19. The shaft 16 serves to support all parts of gearing, as will be described.

Arranged upon the left side of the bearing 15 is a large gear 20, rigidly mounted upon the shaft 16 to rotate therewith and held against longitudinal movement with relation to this shaft. Mounted upon the shaft 16 is an inner clutch element 21, arranged in end-to-end relation to the large gear 20 and contacting therewith and rigidly secured to the gear 20 by pins 22. It is thus seen that the shaft 16, gear 20, and inner clutch element 21 are rigidly connected and turn as a unit. The clutch element 21 is provided at its periphery with recesses 23, to receive rollers 24. Each recess has a shoulder 25 and cam face 26, as shown.

Rotatably mounted upon the left end of the shaft 16 is a cylindrical disk 27, held against longitudinal movement upon the shaft 16. Disposed inwardly of and next to the disk 27 is a small gear 28, rotatable upon the shaft 16, and an outer cylindrical clutch element 29 is disposed inwardly of and next to the small gear 28, and is also rotatable upon the shaft 16. The disk 27, gear 28, and outer clutch element 29 are disposed in contacting relation and are rigidly connected by a pin 30, so that they turn as a unit. The outer clutch element 29 is provided in its right end or face with a cylindrical recess 31, for receiving the inner clutch element 21 and the rollers 24. The elements 21, 24, and 29 constitute an over-running clutch.

Rotatably mounted upon the periphery of the outer clutch element 29 is an annular carrier 32. This carrier is provided with an axial bearing 33, rotatably holding a shaft 34. Rigidly mounted upon one end of the shaft 34 is a small gear 35, engaging the large gear 20. A large gear 36 is rigidly mounted upon the opposite end of the shaft 34 and engages the small gear 28.

The annular carrier 32 is provided upon its periphery with an annular groove 37, radially tapered inwardly. Formed integral with the casing 10 is a ring 37', surrounding the carrier 32 and having fixed guide or guides 38', projecting into the groove 37, and holding the carrier against axial displacement. The groove 37 also receives the tapered end of a brake element 38, mounted to reciprocate in an opening 39 formed in the ring 37'. The upper end of the brake element 38 is forked and straddles a lever 40, and is pivotally connected with the lever by a pin 41, operating within an elongated slot 42 formed in the lever. One end of the lever is secured to a fixed pivot 43. The lever 40 is therefore mounted to swing vertically and will raise and lower the brake element 38. The lever 40 operates within a U-shaped guide 44, bolted to the fixed guide 39, as shown at 45. Rigidly secured to the top of this U-shaped guide is a cross-head 46, having an opening to receive an adjusting screw 47, carrying a lock nut 48. This adjusting screw is provided at its lower end with an extension 49, receiving a thimble 50, extending into a compressible coiled spring 51, engaging the top of the lever 40. This spring 51 moves the lever downwardly to cause the brake element 38 to frictionally engage within the groove 37, and the tension of the spring may be regulated by adjusting the screw 47. Rotatably mounted upon the free end of the lever 40 is a wheel 52, having its axis of rotation extending longitudinally of the lever 40.

The disk 27 is provided upon its periphery with a cam 53, which may be detachably secured thereto by screws 54. The high part of the cam extends from points 55 to 56, Figure 2, which may be substantially three-fourths of the circumference of the disk. The cam 53 is removable, so that another cam may be substituted therefor, having a high part of a different length. The disk 27 is employed to drive mechanism, such as indexing mechanism. This indexing mechanism may embody a reciprocatory element which is to be moved, and for this purpose a connecting rod 57 is pivotally connected with the disk 27, at 58. The indexing mechanism is preferably of the construction shown and described in my application for Indexing mechanism, executed this 24th day of May, 1943, and filed of even date herewith.

The operation of the gearing is as follows:

The shaft 16 is driven counter-clockwise in the direction of the arrow, as viewed from the right end of the gearing, Figures 1 and 3. When the wheel 52 is held raised by the high part of the cam 53, the lever 40 is raised in opposition to the spring 51, and the brake element 38 is elevated so that it does not frictionally engage with the carrier 32, which is now free to rotate upon the outer clutch element 29. The carrier 32 may now turn counter-clockwise, Figures 1 and 3. The shaft 16 is continuously rotated at a constant speed and turns counter-clockwise, Figures 1 and 3, whereby shaft 16, gear 20 and inner clutch element 21 turn as a unit counter-clockwise, and the rollers 24 will lock the outer clutch element 29 with the inner clutch element 21, so that they turn as a unit counter-clockwise, Figures 1 and 3. The outer clutch element 29, small gear 28 and disk 27 turn as a unit, and hence shaft 16, gear 20, clutch element 21, clutch element 29, gear 28 and disk 27 rotate as a unit counter-clockwise and the disk 27 rotates at the same speed as the shaft 16. When the roller 52 passes from the high part of the cam 53, the spring 51 swings the lever 40 downwardly and the brake element 38 frictionally engages the carrier 32 and holds it against rotation, and also limits the downward movement of the lever 40. Since carrier 32 cannot rotate with the outer clutch element 29, as it previously did, shaft 16 rotates gear 20, which rotates gear 35 at an increased speed upon its axis, turning the shaft 34 upon its axis, which rotates the gear 36 upon its axis. The gear 36 rotates the small gear 28 upon its axis at an increased speed, and this rotation is transmitted to the disk 27 and the outer clutch element 29. The outer clutch element 29 and the inner clutch element 21 are now both rotated counter-clockwise, Figures 1 and 3, but the outer clutch element 29 is turning faster than the inner clutch element 21, whereby the rollers 24 unlock these clutch elements. The disk 27 is therefore rotated in the same direction by and with the shaft 16 but at an increased speed. When the wheel 50 again engages the high part of the cam 53, the wheel is raised, and the cycle is repeated. It is thus seen that during each turning cycle of the shaft 16, the disk 27 is turned for a complete cycle. During the major portion of the cycle, the wheel 52 is held elevated by the cam 53, and hence the shaft 16 and disk 27 turn at the same speed, but during the minor portion of the cycle, the wheel 52 disengages the high part of the cam and the disk 27 is turned at a higher speed than the shaft 16.

It is to be understood that the form of my invention herewith shown and described is to be taken as a preferred example of the same, and that various changes in the shape, size and arrangement of parts may be resorted to, without departing from the spirit of my invention or the scope of the subjoined claims.

Having thus described my invention, what is claimed is:

1. In variable speed gearing, a rotatable driving member, a rotatable driven member, an overrunning clutch device including clutch elements, one clutch element being connected with the driving member to rotate therewith and the other clutch element being connected with the driven member to rotate therewith, a gear connected with the driving member to rotate therewith, a gear connected with the driven member to rotate therewith, a carrier arranged near the driving member and having relative turning movement with relation to the driving member, gearing mounted upon the carrier and engaging said gears, means to control the rotation of the carrier, and a cam operated by one member and serving to operate said means.

2. In variable speed gearing, a rotatable driving member, a rotatable driven member, an overrunning clutch device including inner and outer clutch elements, one clutch element being connected with the driving member to rotate therewith and the other clutch element being connected with the driven member to rotate therewith, a gear mounted upon the driving member to rotate therewith, a gear connected wth the driven member to rotate therewith, a carrier mounted upon the outer clutch element to have relative turning movement with relation thereto, gearing mounted upon the carrier and engaging said gears, a brake device to engage the carrier, and a cam driven by one member to actuate the brake device.

3. In variable speed gearing, a rotatable driving member, a rotatable driven member, an overrunning clutch device including clutch elements, one clutch element being connected with the driving member to rotate therewith and the other clutch element being connected with the driven member to rotate therewith, a gear connected with the driving member to rotate therewith, a gear connected with the driven member to rotate therewith, a carrier mounted upon one clutch element to have relative turning movement with relation thereto, gears mounted upon the carrier to turn on their axes as a unit with relation to the carrier and engaging the first named gears, a brake device for coaction with the carrier, means to move the brake device into engagement with the carrier, and a cam driven by one member to move the brake device from the carrier.

4. In variable speed gearing, a rotatable driving member, a rotatable driven member, an overrunning clutch device including clutch elements, one clutch element being connected with the driving member to rotate therewith and the other clutch element being connected with the driven member to rotate therewith, a gear connected with the driving member to rotate therewith, a gear connected with the driven member to rotate therewith, a carrier mounted upon one clutch element to turn with relation thereto, said carrier having a groove in its periphery, a shaft carried by the carrier and extending axially thereof and adapted to turn upon its axis with relation to the carrier, gears mounted upon the shaft and engaging the first named gears, a pivoted lever arranged near the carrier, a brake element carried by the pivoted member to engage within the groove, a spring to move the pivoted lever towards the carrier, and a cam to control the inward movement of the lever.

5. In variable speed gearing, a driving shaft, a clutch element and a gear mounted upon the driving shaft to rotate therewith, a disk and a gear and a second clutch element rotatable as a unit and rotatable with relation to the driving shaft, clutch members arranged between the clutch elements, the clutch elements and members forming an over-running clutch device, a carrier mounted upon one clutch element and having relative turning movement with relation thereto, a shaft mounted upon the carrier, gears mounted upon the shaft and engaging the first named gears, a pivoted lever, a brake element carried by the pivoted lever to engage the carrier, a spring to move the pivoted lever towards the carrier, and a cam mounted upon the disk for moving the lever from the carrier.

6. In variable speed gearing, a rotatable driving member, a rotatable driven member, an over-running clutch device including clutch elements, one clutch element having a cylindrical periphery, one clutch element being connected with the driving member to rotate therewith and the other clutch element being connected with the driven member to rotate therewith, a gear connected with the driving member to rotate therewith, a gear connected with the driven member to rotate therewith, a carrier having an opening formed therein to rotatably receive the cylindrical periphery of the clutch element, speed changing gearing mounted upon the carrier and engaging said gears, and means to control the rotation of the carrier.

7. In variable speed gearing, a rotatable driving member, a rotatable driven member, an over-running clutch device including clutch elements, one clutch element being connected with the driving member and the other clutch element being connected with the driven member, a gear connected with the driving member, a gear connected with driven member, a carrier associated with the driving member and having relative turning movement with relation to the driving member, speed changing gearing mounted upon the carrier and engaging said gears, means to control the turning movement of the carrier, and means operated by one member and serving to operate said means.

CARL HERZOG.